United States Patent [19]
Dewhurst et al.

[11] Patent Number: 5,204,440
[45] Date of Patent: Apr. 20, 1993

[54] POLYURETHANE RIM ELASTOMERS OBTAINED WITH HYDROXYL-CONTAINING HETEROCYCLIC ORGANOTIN CATALYSTS

[75] Inventors: John E. Dewhurst, Macungie; James D. Nichols, Fogelsville, both of Pa.

[73] Assignee: Air Products and Chemicals, Inc., Allentown, Pa.

[21] Appl. No.: 627,087

[22] Filed: Dec. 12, 1990

[51] Int. Cl.$^5$ .................. C08G 18/24; B01J 23/14; B01J 31/12
[52] U.S. Cl. .................. 528/58; 502/156; 502/352
[58] Field of Search .................. 528/58

[56] References Cited

U.S. PATENT DOCUMENTS

| | | | |
|---|---|---|---|
| 3,148,162 | 9/1964 | Gmitter et al. | 528/58 |
| 3,240,730 | 3/1966 | Hostettler et al. | 528/58 |
| 3,786,067 | 1/1974 | Throckmorton et al. | 528/58 |
| 3,945,981 | 3/1976 | Robertson | 528/58 |
| 4,136,046 | 1/1979 | Hirshman et al. | 252/182.27 |
| 4,433,067 | 2/1984 | Rice et al. | 521/51 |
| 4,444,910 | 4/1984 | Rice et al. | 521/51 |
| 4,792,576 | 12/1988 | Nodelman | 521/174 |
| 4,978,728 | 12/1990 | Nichols et al. | 525/528 |
| 4,981,924 | 1/1991 | Nichols et al. | 525/528 |
| 4,981,925 | 1/1991 | Nichols et al. | 525/528 |
| 5,055,543 | 10/1991 | Nakano et al. | 528/58 |
| 5,089,583 | 2/1992 | Nichols et al. | 521/126 |
| 5,089,584 | 2/1992 | Nichols et al. | 521/126 |
| 5,089,645 | 2/1992 | Nichols et al. | 521/126 |
| 5,145,976 | 9/1992 | Nichols et al. | 528/58 |
| 5,149,844 | 9/1992 | Nichols et al. | 528/58 |

*Primary Examiner*—John Kight, III
*Assistant Examiner*—Rabon Sergent
*Attorney, Agent, or Firm*—Michael Leach; James C. Simmons; William F. Marsh

[57] ABSTRACT

The invention relates to reaction injection molded elastomers derived from high molecular weight polyether polyols, an aromatic diamine chain extender, a polyisocyanate and a hydroxyl-containing organotin catalyst. The reaction injection molded (RIM) elastomers of this invention are useful, for example, as automobile body parts.

8 Claims, No Drawings

POLYURETHANE RIM ELASTOMERS OBTAINED WITH HYDROXYL-CONTAINING HETEROCYCLIC ORGANOTIN CATALYSTS

TECHNICAL FIELD

The present invention relates to reaction injection molded (RIM) elastomers.

BACKGROUND OF THE INVENTION

Polyurethane and polyurethaneurea RIM elastomers require the use of tin catalysts for acceptable processing. In a system based on high molecular weight polyether polyols and aromatic diamine chain extenders, it is customary to use dibutyltin dilaurate to catalyze the hydroxyl-isocyanate (OH—NCO) reaction. Without this catalyst additive it is impossible to make a RIM part with sufficient green strength to be demolded. Yet, it is well known that the presence of tin catalyst in the final elastomer limits the thermal stability of the material since it can catalyze the unzipping of urethane bonds. The need for high thermal stability in RIM elastomers is the result of high paint baking temperatures. Physical distortion, cracking, oiling and blistering can be observed if tin catalyst is present to promote the chemical breakdown of urethane linkages.

One solution to this problem has been the use of polyurea RIM based on isocyanate-reactive components which do not contain OH group, e.g., aliphatic amine terminated polyethers as disclosed in U.S. Pat. No. 4,433,067. Since the reaction of the amino (—NH$_2$) groups with NCO groups is so rapid, no tin catalyst is needed although there is still some benefit to their use in polyurea RIM elastomers as disclosed in U.S. Pat. No. 4,444,910. However, the drawback to this solution is the high reactivity of the aliphatic amine terminated polyethers which makes is difficult to achieve high modulus elastomers with good flowability. Additionally, these products are more expensive than conventional RIM polyols and are not available in "filled" versions such as polymer polyols, grafted polyols or PHD polyols.

SUMMARY OF THE INVENTION

The present invention is a reaction injected molded (RIM) elastomer comprising the cured reaction product of a polyether polyol of greater than 500 molecular weight, an aromatic diamine chain extender and an aromatic polyisocyanate in the presence of a hydroxyl-containing diorganotin catalyst. The invention is also a method for preparing a RIM polyurethane elastomer.

The use of a hydroxyl-containing diorganotin catalyst provides for improved thermal stability of conventional polyether polyol polyurethane and polyurethaneurea RIM systems. In addition, unfilled or filled polyols can be used and high modulus elastomers with improved flowability over polyurea RIM systems are obtained.

DETAILED DESCRIPTION OF THE INVENTION

The RIM elastomer of the invention may be prepared from as few as four ingredients, namely a high molecular weight polyether polyol, an aromatic diamine chain extender, an aromatic polyisocyanate and a hydroxyl-containing diorganotin catalyst.

The polyether polyols useful in the invention include primary and secondary hydroxyl-terminated polyether polyols of greater than 500 average molecular weight having from 2 to 6 functionality, preferably from 2 to 3, and a hydroxyl equivalent weight of from 250 to about 2500. Mixtures of polyether polyols may be used. In a prefered embodiment the polyether polyols have an average molecular weight of at least 6000.

The polyether polyols useful in the invention are polyether polyols made from an appropriate initiator to which lower alkylene oxides such as ethylene oxide, propylene oxide, butylene oxide or mixtures thereof are added resulting in hydroxyl-terminated polyols. When two or more oxides are used, they may be present as random mixtures or as blocks of one or the other polyether. Thus the polyalkylene ether polyols include the poly(alkylene oxide) polymers, such as poly(ethylene oxide) and poly(propylene oxide) polymers and copolymers, with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

The aromatic diamine chain extenders useful in this invention include, for example, 1-methyl-3,5-diethyl-2,4 diaminobenezene; 1-methyl-3,5-diethyl-2-6-diaminobenzene (both of these materials are also called diethyl toluenediamine or DETDA); 1,3,5-triethyl-2,6-diaminobenzene; 2,4-dimethyl-6-t-butyl-3,5-diaminobenzene; 3,5,3',5'-tetraethyl-4,4'-diamino diphenylmethane; 1-methyl-3-t-butyl-2,4-diaminobenzene; 1-methyl-5-t-butyl-2,6-diaminobenzene (both these materials are also called t-butyl toluenediamine or TBTDA) and the like. Particularly preferred aromatic diamine chain extenders are DETDA and TBTDA. It is within the scope of the invention to include some aliphatic chain extender materials as described in U.S. Pat. Nos. 4,246,363 and 4,269,945.

A wide variety of aromatic polyisocyanates may be used. Typical aromatic polyisocyanates include phenylenediisocyanate, toluenediisocyanate and 4,4'-diphenylmethanediisocyanate. Especially suitable are the 2,4- and 2,6-toluenediisocyanates individually or together as their commercially available mixtures. Other especially suitable mixtures of diisocyanates are those known commercially as "crude MDI" also known as PAPI, which contain about 60% of 4,4'-diphenylmethanediisocyanate along with other isomeric and analogous higher polyisocyanates. Also suitable are "prepolymers" of these polyisocyanates comprising a partially prereacted mixture of polyisocyanates and polyether polyols.

The hydroxyl-containing diorganotin catalyst suitably may be a compound of the following general formula:

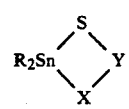

where

R is a $C_1$-$C_8$ alkyl group, preferably n-butyl or octyl, or an aryl group, preferably phenyl;

Y is

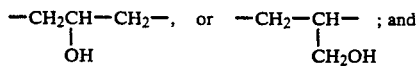

X is a linking group which may be —S— or —O—.

A general procedure for preparing the 2,2-diorganotin-1,3-dithia-; -1,3-dioxa-; or -1,3-oxathiacycloalkanes would involve charging a mixture of the organotin oxide ($R_2SnO$), the appropriate glycol, dimercaptan or hydroxyalkyl mercaptan and a solvent such as toluene to a reaction vessel and heating the reaction mixture to reflux temperature until all the water of reaction has been removed by distillation. The organic solvent can then be evaporated to afford essentially quantitative product yields of the diorganotin cycloalkane.

When using refluxing toluene, it is desirable to keep the reaction period short (under about 1 hour) to maximize the cyclic product and minimize the possible conversion to linear polymeric material.

A catalytically effective amount of the diorganotin catalyst is used in the RIM elastomer formulation comprising polyisocyanate, aromatic diamine and polyether polyol. Specifically, suitable amounts of the catalyst may range from about 0.025 to 0.3 parts, preferably 0.05 to 0.2 parts, per 100 parts by weight polyether polyol in the RIM elastomer formulation.

Other conventional RIM formulation ingredients may be employed as needed, such as, for example, foam stabilizers, also known as silicone oils or emulsifiers. The foam stabilizer may be an organic silane or siloxane.

Reinforcing materials, if desired, used in the practice of the invention are known to those skilled in the art. For example, chopped or milled glass fibers, chopped or milled carbon fibers and/or other mineral fibers are useful.

Postcuring of the elastomer of the invention is optional and its employment depends on the desired properties of the end product. Postcuring will improve some properties such as heat sag.

EXAMPLE 1

2,2-Dibutyltin-1,3-oxathiacyclohexane-5-ol

A mixture of 24.9 g (0.10 mole) dibutyltin oxide, 10.8 g (0.10 mole) 3-mercapto-1,2-propanediol (1-thioglycerol) in 300 ml toluene were charged to a round-bottom glass reaction flask equipped with a mechanical stirrer, thermocouple and reflux condenser with a Dean-Stark water trap. The mixture was heated to reflux temperature, with agitation, and continued at this temperature until a clear, homogeneous solution formed and all the water (1.8 ml) of reaction was collected in the trap. The toluene was removed using a flash evaporator to yield 33 g (97% yield) of 2,2-dibutyltin-1,3-oxathiacyclohexane-5-ol, a transparent semi-solid (pourable at 100° C.).

In the following examples, the RIM elastomer runs were conducted using the following materials:

Multranol M 3901—a glycerine-initiated polyoxyalkylene polyether triol having a hydroxyl number of 28 from Mobay Corp.

L-5304—a commercial silicone surfactant from Union Carbide.

DC-198—a commercial silicone surfactant from Air Products and Chemicals, Inc.

Mondur PF—4,4'-diphenyldiisocyanate, which has been liquified by reaction with a low molecular weight glycol to an NCO content of about 22.6% from Mobay Corp.

Dabco 33LV—a 33% solution of triethylenediamine in a glycol carrier from Air Products and Chemicals, Inc.

DETDA—an 80/20 mixture of 3,5-diethyl-2,4-toluenediamine and 3,5-diethyl-2,6-toluenediamine from Ethyl Corp.

t-BTDA—an 80/20 mixture of 5-t-butyl-2,4-toluenediamine and 3-t-butyl-2,6-toluenediamine from Air Products and Chemicals, Inc.

T-12—dibutyltin dilaurate from Air Products and Chemicals, Inc.

T-120—dibutyltin-bis(laurylmercaptide) from Air Products and Chemicals, Inc.

UL-28—dimethyltin dilaurate from Witco Chemical Corp.

Reaction injection molding elastomers were prepared using a model SA8-20 laboratory machine (LIM Kuntstoff Technologie GmbH, Kittsee, Austria) suitable for processing 2-component mixtures. 10-30 cc/min metering pumps for component "A" (modified methylenediphenyldiisocyanate, MDI) and "B" (polyether polyol plus chain extender, silicone and catalyst) were driven synchronously by sprocket wheels in proportion to the mixture to be processed by means of a variable speed (50-250 rpm) motor. Any desired mixing ratio may be established by changing gears. Components A and B were conveyed into a mixing chamber by individually controlled compressed air actuated valves. A high-speed rotor, continuously adjustable from 10,000 to 18,000 rpm using a frequency transformer, mixed the components.

EXAMPLE 2

For Runs A–C flat placque parts (200×200×2 mm with an average weight of 100 g) were made according to the formulations in Table 1 and were postcured at 120° C. for 1 hour. In each system, the tin metal content was held constant. Thermal stability was determined by annealing the parts for 80 minutes at 165° C., followed by visual and tactile inspection. Both Runs A and B made with non-isocyanate-reactive catalysts (T-12 and T-120) crumbled into pieces as a result of this thermal abuse.

TABLE 1

| Run | A | B | C |
|---|---|---|---|
| M-3901 | 100 | 100 | 100 |
| t-BTDA | 26 | 26 | 26 |
| L-5304 | 0.8 | 0.8 | 0.8 |
| Dabco-33LV | 0.126 | 0.126 | 0.126 |
| Tin Catalyst | | | |
| Type | T-12 | T-120 | Ex 1 |
| Level | 0.126 | 0.13 | 0.065 |
| Mondur PF | 66.7 | 66.7 | 66.7 |
| Condition After Annealing | Crumbly | Crumbly | Good |

EXAMPLE 3

For Runs D–H flat placque parts (200×200×2 mm, with an average weight of 100 grams) were made according to the formulations in Table 2 were postcured at 121° C. for one hour. In each system the tin metal content was held constant. Thermal stability was judged by the high temperature heat sags. Lower sags indicate increased thermal stability. Those Runs made with isocyanate-reactive catalysts showed lower heat sags than conventionally used T-12.

TABLE 2

| Run | D | E | F | G | H |
|---|---|---|---|---|---|
| M-3901 | 100 | 100 | 100 | 100 | 100 |
| DETDA | 30.2 | 30.2 | 30.2 | 30.2 | 30.2 |
| DC 198 | .92 | .92 | .92 | .92 | .92 |
| DABCO 33LV | .13 | .13 | .13 | .13 | .13 |
| Tin Catalyst | | | | | |
| Type | T-12 | T-12 | T-120 | UL-28 | Ex 1 |
| Level | .13 | .26 | .13 | .11 | .071 |
| Mondur PF | 57.8 | 57.8 | 57.8 | 57.8 | 57.8 |
| 4" 325° F. Sag | 0.754 | 0.722 | 0.506 | 0.529 | 0.586 |

The hydroxyl-containing diorganotin catalysts, being isocyanate-reactive, become part of the polymer matrix and are therefore not sufficiently mobile to promote thermal degradation of urethane-containing elastomers. Surprisingly, these compounds are still able to provide enough catalytic activity to permit the molding of RIM elastomers.

STATEMENT OF INDUSTRIAL APPLICATION

The present invention provides polyether polyol RIM elastomers made using hydroxyl-containing organotin catalysts.

We claim:

1. A reaction injection molded elastomer made by reacting in a closed mold a composition comprising polyether polyols greater than 500 average molecular weight, an aromatic diamine chain extender, an aromatic polyisocyanate and an organotin catalyst of the following general formula:

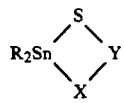

where
R is a $C_1$–$C_8$ alkyl or an aryl group,
Y is

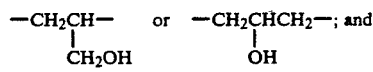

X is —S— or —O—.

2. The elastomer of claim 1 in which R is butyl or octyl.
3. The elastomer of claim 1 in which X is —O—.
4. The elastomer of claim 1 in which Y is —CH$_2$—CH(OH)—CH$_2$—.
5. The elastomer of claim 3 in which Y is —CH$_2$—CH(OH)—CH$_2$—.
6. The elastomer of claim 1 in which X is —S—.
7. A reaction injection molded elastomer made by reacting in a closed mold a composition comprising polyether polyols greater than 500 average molecular weight, an amine terminated chain extender, an aromatic polyisocyanate and an organotin catalyst of the following general formula

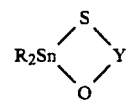

where
R is butyl or octyl and
Y is —CH$_2$—CH(OH)—CH$_2$—.

8. The elastomer of claim 7 in which R is butyl.

* * * * *